US012707495B2

(12) United States Patent
Miao et al.

(10) Patent No.: US 12,707,495 B2
(45) Date of Patent: Aug. 11, 2026

(54) METHODS FOR COMMUNICATION, TERMINAL DEVICE, AND COMPUTER READABLE MEDIA

(71) Applicant: NEC CORPORATION, Tokyo (JP)

(72) Inventors: Zhaobang Miao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 211 days.

(21) Appl. No.: 18/282,340

(22) PCT Filed: Mar. 16, 2021

(86) PCT No.: PCT/CN2021/081150

§ 371 (c)(1),
(2) Date: Sep. 15, 2023

(87) PCT Pub. No.: WO2022/193146

PCT Pub. Date: Sep. 22, 2022

(65) Prior Publication Data

US 2024/0163918 A1 May 16, 2024

(51) Int. Cl.
*H04W 74/0808* (2024.01)

(52) U.S. Cl.
CPC ............................... *H04W 74/0808* (2013.01)

(58) Field of Classification Search
CPC ................................................ H04W 74/0808
See application file for complete search history.

(56) References Cited

U.S. PATENT DOCUMENTS

| | | | |
|---|---|---|---|
| 2019/0132818 A1 | 5/2019 | Yasukawa et al. |
| 2021/0007081 A1 | 1/2021 | Shin et al. |
| 2021/0007096 A1 | 1/2021 | Huang et al. |
| 2021/0235499 A1 | 7/2021 | Yasukawa et al. |

FOREIGN PATENT DOCUMENTS

| | | |
|---|---|---|
| CN | 109804682 A | 5/2019 |
| WO | 2017/179286 A1 | 10/2017 |

OTHER PUBLICATIONS

Moderator (Oppo): “FL summary for AI 8.11.1.1—resource allocation for power saving”, 3GPP Draft; R1-2101412, 3rd Generation Partnership Project (3GPP), Mobile Competence Centre; 650, Route Des Lucioles; F-06921 Sophia-Antipolis Cedex France, vol. RAN WG1, No. e-Meeting; Jan. 25, 2021-Feb. 5, 2021, XP051977622 (Oppo).*

(Continued)

*Primary Examiner* — Myron Wyche

(57) ABSTRACT

Embodiments of the present disclosure relate to devices, methods, devices and computer readable storage media for sensing procedure in sidelink transmission. The method comprises performing a sensing procedure for a set of candidate resources associated with a sidelink transmission within a first sensing window after a first time slot; generating a sensing report at least based on the sensing procedure; and providing the sensing report from a physical layer to a higher layer at a second time slot determined based on at least one reference slot associated with the set of candidate resource. In this way, the sensing result of a sensing procedure after the sensing trigger slot can be reported.

6 Claims, 3 Drawing Sheets

(56) References Cited

OTHER PUBLICATIONS

"Considerations on partial sensing in NR V2X", CAICT, R1-2100309, 3GPP TSG RAN WG1 Meeting #104-e, e-Meeting, Jan. 25-Feb. 5, 2021, 4 pages.
"Considerations on partial sensing in NR V2X", Fujitsu, R1-2007787, 3GPP TSG RAN WG1 Meeting #103-E, e-Meeting, Oct. 26-Nov. 13, 2020, pp. 1-18.
International Search Report for PCT/CN2021/081150 dated Dec. 15, 2021 (PCT/ISA/210).
Written Opinion for PCT/CN2021/081150 dated Dec. 15, 2021 (PCT/ISA/237).
JP Office Action for JP Application No. 2023-557275, mailed on Apr. 1, 2025 with English Translation.
"FL summary for AI 8.11.1.1—resource allocation for power saving," Moderator (Oppo), 3GPP TSG RAN WG1 #104-e, Jan. 25-Feb. 5, 2021, Discussion and Decision, R1-2101412 (91 pages total).
"FL summary for AI 8.11.2.1—resource allocation for power saving," Moderator (Oppo), 3GPP TSG RAN WG1 #103-e, Oct. 26-Nov. 13, 2020, Discussion and Decision, R1-2009584 (64 pages total).
"Discussion on partial sensing and SL DRX impact," Asustek, 3GPP TSG RAN WG1 #104-e, Jan. 25-Feb. 5, 2021, Discussion and Decision, R1-2101572 (3 pages total).
"Discussion on sidelink resource allocation for power saving," Xiaomi, 3GPP TSG RAN WG1 #103-e, Oct. 26-Nov. 13, 2020, Discussion, R1-2009037 (4 pages total).
Extended European Search Report issued Mar. 12, 2024 in Application No. 21930742.8.

* cited by examiner

METHODS FOR COMMUNICATION, TERMINAL DEVICE, AND COMPUTER READABLE MEDIA

CROSS REFERENCE TO RELATED APPLICATIONS

This application is a National Stage of International Application No. PCT/CN2021/081150 filed Mar. 16, 2021.

FIELD

Embodiments of the present disclosure generally relate to the field of telecommunication and in particular, to devices, methods, devices and computer readable storage media for sensing procedure in sidelink transmission.

BACKGROUND

In resource allocation mode 2 for the sidelink transmission, in slot n, the higher layer can request the User Equipment (UE) to determine a subset of resources from which the higher layer will select resources for Physical Sidelink Shared Channel (PSSCH)/Physical Sidelink Control Channel (PSCCH) transmission.

In physical layer, when receives the request in slot n, the UE can determine the subset of resources as the candidate single-slot resources after resource exclusion procedure from a set of candidate single-slot resources.

In high layer, the Medium Access Control (MAC) entity randomly selects the time and frequency resources for one transmission opportunity from the the subset of resources indicated by the physical layer in slot n.

SUMMARY

In general, example embodiments of the present disclosure provide a solution for sensing procedure in sidelink transmission.

In a first aspect, there is provided a method for communications. The method comprises performing a sensing procedure for a set of candidate resources associated with a sidelink transmission within a first sensing window after a first time slot; generating a sensing report at least based on the sensing procedure; and providing the sensing report from a physical layer to a higher layer at a second time slot determined based on at least one reference slot associated with the set of candidate resource.

In a second aspect, there is provided a terminal device. The terminal device comprises a processor and a memory storing instructions. The memory and the instructions are configured, with the processor, to cause the terminal device to perform the method according to the first aspect.

In a third aspect, there is provided a computer readable medium having instructions stored thereon. The instructions, when executed on at least one processor of a device, cause the device to perform the method according to the first aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the drawings, the same or similar reference numerals represent the same or similar element.

DETAILED DESCRIPTION

Figure 1:
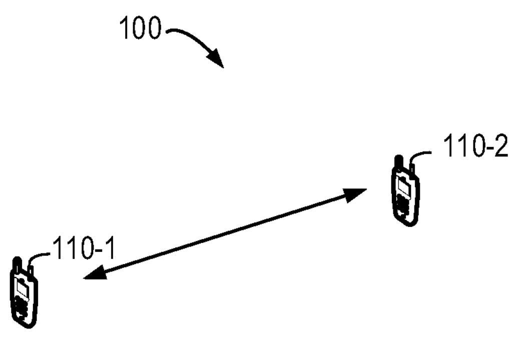
FIG. 1 illustrates an example environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish functionalities of various elements. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to Mobile Termination (MT) part of the integrated access and backhaul (IAB) node (a.k.a. a relay node). In the following description, the terms "terminal device", "communication device", "terminal", "user equipment" and "UE" may be used interchangeably.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

The term "circuitry" used herein may refer to hardware circuits and/or combinations of hardware circuits and software. For example, the circuitry may be a combination of analog and/or digital hardware circuits with software/firmware. As a further example, the circuitry may be any portions of hardware processors with software including digital signal processor(s), software, and memory(ies) that work together to cause an apparatus, such as a terminal device or a network device, to perform various functions. In a still further example, the circuitry may be hardware circuits and or processors, such as a microprocessor or a portion of a microprocessor, that requires software/firmware for operation, but the software may not be present when it is not needed for operation. As used herein, the term circuitry also covers an implementation of merely a hardware circuit or processor(s) or a portion of a hardware circuit or processor(s) and its (or their) accompanying software and/or firmware.

FIG. 1 shows an example communication network 100 in which embodiments of the present disclosure can be implemented. The network 100 includes terminal devices 110-1 and 110-2 (hereinafter may also be referred to as a terminal device 110 or a UE 110 collectively). The terminal devices 110-1 and 110-2 may communicate with each other. For example, the terminal device 110-1 can be considered as the transmitting UE and the terminal device 110-2 can be considered as receiving UE. It is to be understood that the number of terminal devices is only for the purpose of illustration without suggesting any limitations. The network 100 may include any suitable number of terminal devices adapted for implementing embodiments of the present disclosure.

The communication network 100 can be implemented in a scenario of V2X communication. As mentioned above, V2X communication can be divided into four types, including Vehicle-to-Vehicle (V2V), Vehicle-to-Pedestrian (V2P), Vehicle-to-Infrastructure (V2I), Vehicle-to-Network (V2N). Communication between terminal devices (that is, V2V, V2P, V2I communications) can be performed via sidelinks. For sidelink-based V2X communication, information may be transmitted from a Transmit (TX) terminal device to one or more Receive (RX) terminal devices in a broadcast, or groupcast, or unicast manner.

Depending on the communication technologies, the network 100 may be a Code Division Multiple Access (CDMA) network, a Time Division Multiple Address (TDMA) network, a Frequency Division Multiple Access (FDMA) network, an Orthogonal Frequency-Division Multiple Access (OFDMA) network, a Single Carrier-Frequency Division Multiple Access (SC-FDMA) network or any others. Communications discussed in the network 100 may conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols. The techniques described herein may be used for the wireless networks and radio technologies mentioned above as well as other wireless networks and radio technologies. For clarity, certain aspects of the techniques are described below for LTE, and LTE terminology is used in much of the description below.

For the sidelink transmission, a transmitting UE may perform a sensing procedure for resource selection. In resource allocation mode 2 of the sidelink transmission, the higher layer can request the UE to determine a subset of resources from which the higher layer will select resources for PSSCH/PSCCH transmission.

To trigger this procedure, in slot n, the higher layer can provide specific parameters for this PSSCH/PSCCH transmission. The specific parameters may, for example, comprise the resource pool from which the resources are to be reported, the LI priority, the remaining packet delay budget and the resource reservation interval in units of msec, etc.

In physical layer, when receives the request in slot n, the UE can determine the subset of resources (hereinafter may also be referred to as ($S_A$)) as the candidate single-slot resources after resource exclusion procedure from a set of candidate single-slot resources (hereinafter may also be referred to as ($S_B$)). In high layer, the MAC entity can randomly select the time and frequency resources for one transmission opportunity from the the subset of resources ($S_A$) indicated by the physical layer in slot n. In partial sensing, $S_B$ refers to partial single-slot resources in the resource selection window.

In a resource pool (pre-)configured with at least partial sensing, if the UE performs periodic-based partial sensing, at least when the reservation for another TB (when carried in SCI) is enabled for the resource pool and resource selection/reselection is triggered at slot n, it is up to UE implementation to determine a set of Y candidate slots within a resource selection window. For the periodic-based partial sensing, the UE can monitor slots of at least one periodic sensing occasion.

In Rel-17, it has been specified that the sensing occasions of the partial sensing can exist after trigger slot n for a short reservation periods and aperiodic traffics and reporting the subset of candidate resource in slot n is not suitable considering other sensing results after slot n. In this case, the report timing and content for other sensing results after slot n may need to be discussed.

Furthermore, it has been specified that in the partial sensing procedure after trigger slot n, the UE can monitor slots between [$n+T_A$, $n+T_B$] and performs identification of candidate resources, in or after slot $n+T_B$. How to determine the slot $n+T_B$ may also need to be discussed.

The present disclosure proposes a solution for sensing procedure in sidelink transmission. In this solution, the UE may perform an additional sensing procedure for a set of candidate resources associated with a sidelink transmission within a first sensing window after a first time slot. Based on the sensing procedure, the UE may generate a sensing report and cause the sensing report to be provided from a physical layer to a higher layer at a second time slot determined based on at least one reference slot associated with the set of candidate resource. In this way, the sensing result of a sensing procedure after the sensing trigger slot can be reported.

Figure 2:
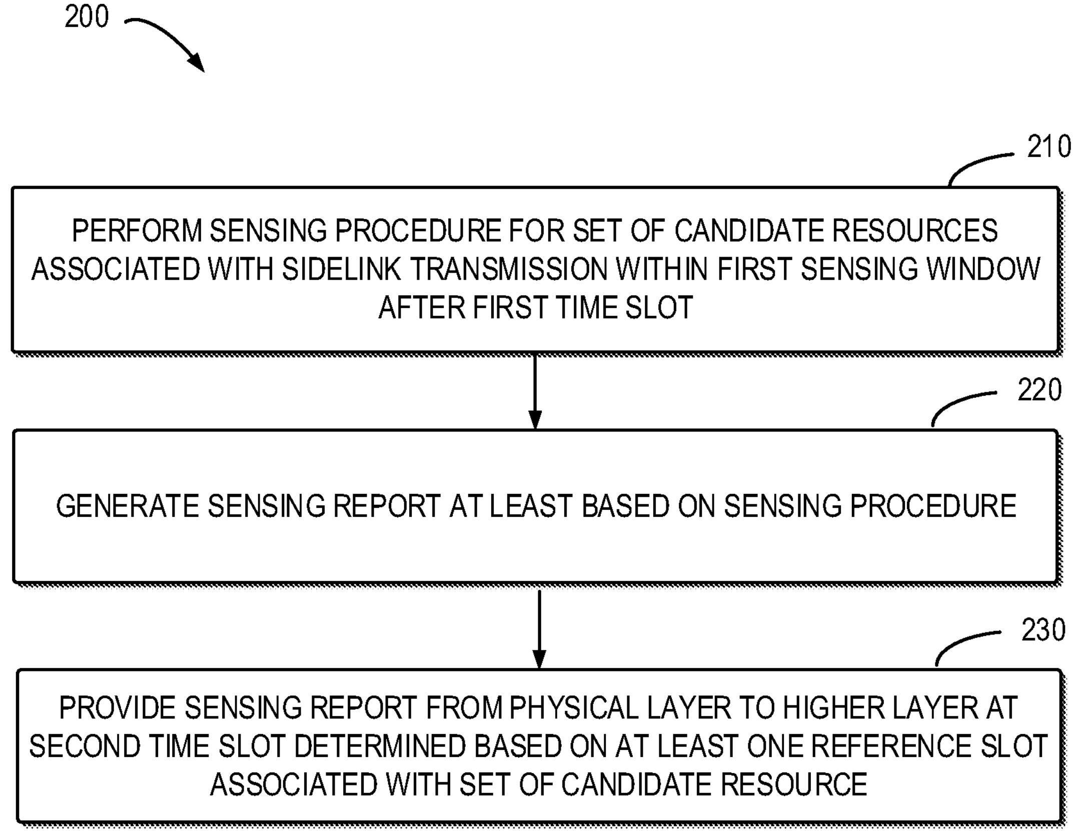
FIG. 2 shows flowchart of an example method for sensing procedure according to some example embodiments of the present disclosure.

Principle and implementations of the present disclosure will be described in detail below with reference to FIG. 2. FIG. 2 shows a flowchart of an example method 200 of resource selection according to some example embodiments of the present disclosure. The method 200 can be implemented at the terminal device 110-1 or the terminal device 110-2 as shown in FIG. 1. For the purpose of discussion, the method 200 will be described with reference to FIG. 1.

After receiving a sensing trigger at a first time slot, at 210, the terminal device 110 may perform a sensing procedure for a set of candidate resources associated with a sidelink transmission after the first time slot. In some example embodiments, the sensing procedure occurred after the first time slot may be referred to as a contiguous partial sensing (CPS) or a short-term sensing (STS). The UE can perform the sensing procedure within a first sensing window. The first sensing window can be referred to as a reference sensing window different from a previous sensing window for a previous sensing procedure occurred before the first time slot. Hereinafter the previous sensing window can be referred to as a second sensing window.

At 220, the terminal device 110 may generate a sensing report at least based on the sensing procedure. At 230, the terminal device 110 may cause the sensing report to be provided from a physical layer to a higher layer at a second time slot. The second time slot can be determined based on at least one reference slot associated with the set of candidate resource.

It is to be understood that the term "slot" may be referred as to a time period in the time domain resources for the transmission. Any other suitable time granularity such as subframe and millisecond, can also be considered as the time period.

Figure 3:
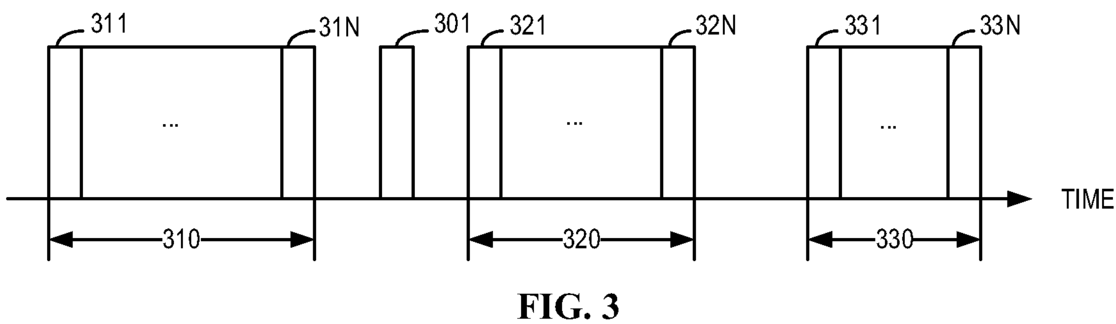
FIG. 3 shows a sequence diagram of sensing procedure according to some example embodiments of the present disclosure.

FIG. 3 shows a sequence diagram of sensing procedure according to some example embodiments of the present disclosure. With reference to FIG. 3, example embodiments of the present disclosure can be better understood.

As shown in FIG. 3, after receiving the sensing trigger at the first time slot 301, the terminal device 110 may perform a sensing procedure within a first sensing window located in a time domain range from slot 321 to 32N for a set of candidate resources in a resource selection window located in a time domain range from slot 331 to 33N. A previous sensing procedure can be performed within a second sensing window located in a time domain range from slot 311 to 31N before the slot 301. In this case, the sensing procedure performed after the first time slot 301 may be referred to as a CPS.

In some example embodiments, the second time slot can depend upon the time domain range of the first sensing window of the sensing procedure. For example, the terminal device 110 can determine the second time slot based on the end point of the first sensing window and a first offset time period for processing a result of the sensing procedure.

In some example embodiments, the second time slot for providing the sensing report may be determined based on the end point of the first sensing window and a first offset time period for processing a result of the sensing procedure by:

$$n' = n + \mathrm{T\_b} + \mathrm{T\_proc,0} \quad (1)$$

where n' represents the second time slot for providing the sensing report, n represents the first time slot 301, n+T_b represents the end point (slot 32N shown in FIG. 3) of the first sensing window and T_proc,0 represents the first offset time period.

As described above, the end point of the first sensing window is still to be defined. In some example embodiments, the end point of the first sensing window may be determined based on at least one reference slot associated with the set of candidate resource, i.e., at least one reference slot selected from a set of slots (from slot 331 to 33N) in the resource selection window 330.

In some example embodiments, the terminal device 110 can determine the end point of the first sensing window based on a first reference time slot in the set of reference time slots [slot 331, slot 33N] and a predefined reservation time period supported by a resource pool associated with the sidelink transmission.

In some example embodiments, the end point of the first sensing window is determined based on a first reference time slot in the set of reference time slots [slot 331, slot 33N] and a predefined reservation time period supported by a resource pool associated with the sidelink transmission by:

$$n + \mathrm{T\_b} = \mathrm{y\_k} - \mathrm{P\_rev} \quad (2)$$

where n+T_b represents the end point (slot 32N shown in FIG. 3) of the first sensing window, y_k represents the first reference time slot in the set of reference time slots located in a time domain range of the set of candidate resources for the sidelink transmission and P_rev represents the reservation periods in ms supported by the resource pool and is converted to number of sidelink slots.

In some example embodiments, the first reference time slot y_k can be the last one of the set of reference time slots, i.e. the slot 33N shown in FIG. 3. In some example embodiments, the P_rev can be the shortest one of the reservation periods supported by the resource pool.

In some example embodiments, the terminal device 110 can determine the end point of the first sensing window based on a first reference time slot and a second reference time slot in the set of reference time slots [slot 331, slot 33N], a predefined reservation time period supported by a resource pool associated with the sidelink transmission and a first offset time period for processing a result of the sensing procedure and a second offset time period for a resource selection for the sidelink transmission.

Specifically, the terminal device 110 can determine the end point of the first sensing window based on a minimum value from a first difference and a second difference, wherein the first difference can be determined based on a first reference time slot in the set of reference time slots and the predefined reservation time period, and the second difference can be determined based on a second reference time slot, the first offset time period and the second offset time period.

In some example embodiments, the end point of the first sensing window is determined based on the minimum value from the first difference and the second difference by:

$$n + \mathrm{T\_b} = \min[\mathrm{y\_k1} - \mathrm{P\_rev}, \mathrm{y\_k2} - T1 - \mathrm{T\_proc,0}] \quad (3)$$

where n+T_b represents the end point (slot 32N shown in FIG. 3) of the first sensing window, y_k1 and y_k2 represent the first reference time slot and the second reference time slot in the set of reference time slots located in a time domain range of the set of candidate resources for the sidelink transmission, respectively, P_rev represents the reservation periods supported by the resource pool, T1 represents the second offset time period and T_proc,0 represents the first offset time period.

In some example embodiments, the first reference time slot y_k1 can be the last slot of the set of reference time slots, i.e., the slot 33N shown in FIG. 3. In some example embodiments, the P_rev can be the shortest one of the reservation periods supported by the resource pool.

In some example embodiments, the second reference time slot y_k2 can be the first slot of the set of reference time slots, i.e. the slot 331 shown in FIG. 3. In some example embodiments, the second reference time slot y_k2 can be the first slot in the set of reference time slots on which available resources for the sidelink transmission are contained. That is, the resources associated with second reference time slot is not excluded from the set of candidate resources for the sidelink transmission after the sensing procedure.

In some example embodiments, the terminal device 110 can determine the end point of the first sensing window based on a second reference time slot in the set of reference time slots [slot 331, slot 33N] and a first offset time period for processing a result of the sensing procedure and a second offset time period for a resource selection for the sidelink transmission.

In some example embodiments, the end point of the first sensing window is determined based on the second reference time slot, the first offset time period and the second offset time period by:

$$n + \mathrm{T\_b} = \mathrm{y\_k} - T1 - \mathrm{T\_proc,0} \quad (4)$$

where n+T_b represents the end point (the slot 32N shown in FIG. 3) of the first sensing window, y_k represents the second reference time slot in the set of reference time slots located in a time domain range of the set of candidate resources for the sidelink transmission, T1 represents the second offset time period and T_proc,0 represents the first offset time period.

In some example embodiments, the second reference time slot y_k can be the first one of the set of reference time slots, i.e. the slot 331 shown in FIG. 3. In some example embodiments, the second reference time slot y_k can be the first slot in the set of reference time slots on which available resources for the sidelink transmission are contained.

In some example embodiments, the start point (the slot 321 shown in FIG. 3) of the first sensing window, which can be represented by n+T_a, can be determined based on a third offset time period for preparing to start the sensing procedure from the first time slot (slot 301 shown in FIG. 3).

Now referring back to FIG. 3, after determining a set of reference time slots located in a time-domain range of the set of candidate resources, the terminal device 110 may perform a sensing procedure within a first sensing window located in a time domain range from slot 321 to 32N before a reference time slot in the set of reference time slots. In this case, the sensing procedure performed after the first time slot 301 may be referred to as STS.

Thus, the second time slot for providing the sensing report can depend upon the reference time slot in the set of reference time slots [slot 331, slot 33N].

In some example embodiments, the terminal device 110 can determine the second time slot based on a second reference time slot in the set of reference time slots and a second offset time period for a resource selection for the sidelink transmission.

In some example embodiments, the second time slot can be determined based on the second reference time slot and the second offset time period for a resource selection for the sidelink transmission by:

$$n'' = \mathrm{y\_k} - \mathrm{T\_1} \tag{5}$$

where n" represents the second time slot for providing the sensing report, y_k represents the second reference time slot and T1 represents the second offset time period.

In this case, the start and end points of the STS window can also depend on one of the set of reference time slots. For example, the start and end points of the STS window can be determined based on the the second reference time slot. The start and end points of the STS window can be determined based on the the second reference time slot by:

$$\text{start point of the } STS \text{ window} = \mathrm{y\_k} - 31\mathrm{y\_k} - 31; \tag{6}$$

$$\text{end point of the } STS \text{ window} = \mathrm{y\_k} - \mathrm{T\_1} - \mathrm{T\_proc}, \tag{7}$$

respectively, where y_k represents the second reference time slot, T1 represents the second offset time period and T_proc,0 represents the first offset time period.

In this case, the second reference time slot y_k can be the first one of the set of reference time slots, i.e. the slot 331 shown in FIG. 3. In some example embodiments, the second reference time slot y_k can be the first slot in the set of reference time slots on which available resources for the sidelink transmission are contained.

As described above, the terminal device 110 can determine a second time slot for providing the sensing portion from the physical layer to the higher layer based on a first sensing window of a sensing procedure performed after the trigger slot n or a reference time slot in the set of reference time slots located in a time-domain range of the set of candidate resources for the sidelink transmission.

Another issue to be discussed in the present disclosure is the content of the sensing report. If the terminal device 110 performs an additional sensing procedure, i.e., a CPS procedure or a STS procedure after the trigger slot n, the terminal device 110 may generate the sensing report at least based on the sensing result of the additional sensing procedure.

In some example embodiments, the sensing report may be generated only based on the sensing result of the additional sensing procedure. In this case, the sensing report may indicate available resources for the sidelink transmission obtained from the sensing result of the additional sensing procedure.

In some example embodiments, the sensing report may be generated only based on the sensing result of the additional sensing procedure and a previous sensing result of a previous sensing procedure performed before the first time slot (the trigger slot n).

For example, the sensing report may indicate available resources for the sidelink transmission obtained from the sensing result of the additional sensing procedure and the previous sensing result of a previous sensing procedure.

Alternatively, the sensing report may also indicate unavailable resources for the sidelink transmission to be excluded from available resources for the sidelink transmission obtained from the previous sensing result. The unavailable resources can be obtained from the sensing result of the additional sensing procedure.

In some example embodiments, it is possible that the terminal device 110 may perform more than one additional sensing procedure after the trigger slot n. For example, the terminal device 110 may perform both CPS procedure and STS procedure.

In this case, for example, the sensing report may indicate available resources for the sidelink transmission obtained from the sensing result of the additional sensing procedure (for example, the STS procedure), a previous sensing result of a previous sensing procedure performed before the trigger slot and a further previous sensing result of a previous additional sensing procedure (for example, the CPS procedure) performed before the additional sensing procedure.

As another option, the sensing report may indicate unavailable resources for the sidelink transmission to be excluded from available resources for the sidelink transmission obtained from a previous sensing result of a previous sensing procedure performed before the trigger slot and a further previous sensing result of a previous additional sensing procedure (for example, the CPS procedure). The unavailable resources can be obtained from the sensing result of the additional sensing procedure (for example, the STS procedure).

In some example embodiments, the content of sensing report to be reported from the physical layer to the higher layer can be pre-configured via a Radio Resource parameter "reportSet".

Furthermore, some specific conditions can be defined for the terminal device 110 to perform the sensing procedure after the first time slot (the trigger slot n). That is, only if a specific condition for performing the additional sensing procedure is satisfied, the terminal device 110 may perform the sensing procedure after the first time slot.

In some example embodiments, if the terminal device 110 determines that at least one reference time slot y_k in a set of reference time slots located in a time-domain range of the set of candidate resources satisfies that y_k–P_rev locates after the first time slot (trigger slot n) or after a second sensing window of previous sensing procedure performed before the trigger slot n, the terminal device 110 may perform the additional sensing procedure after trigger slot n. P_rev may represent the reservation periods supported by the resource pool.

In some example embodiments, the reference time slot y_k can be the last one of the set of reference time slots. In some example embodiments, the P_rev can be the shortest one of the reservation periods supported by the resource pool.

Alternatively, if the terminal device 110 determines that a radio resource control parameter indicating that the sensing procedure is enabled, the terminal device 110 may perform the sensing procedure. For example. a CPS procedure can be indicated by RRC parameter "cpsEnable". Similarly, a STS procedure can be indicated by RRC parameter "stsEnable".

It is also possible that the terminal device 110 may perform the sensing procedure if the terminal device 110 determines that a higher layer parameter concerning resource reservation is not configured. For example, if the higher layer parameter "sl-MultiReserveResource" is not configured/absent, the terminal device 110 may perform the sensing procedure.

The present disclosure discusses the report timing for a sensing report of the additional sensing procedure, the content of the sensing report and the condition for performing the additional sensing procedure. Therefore, the sensing result of a sensing procedure after the sensing trigger slot can be reported from the physical layer to the higher layer in a suitable way.

Figure 4:
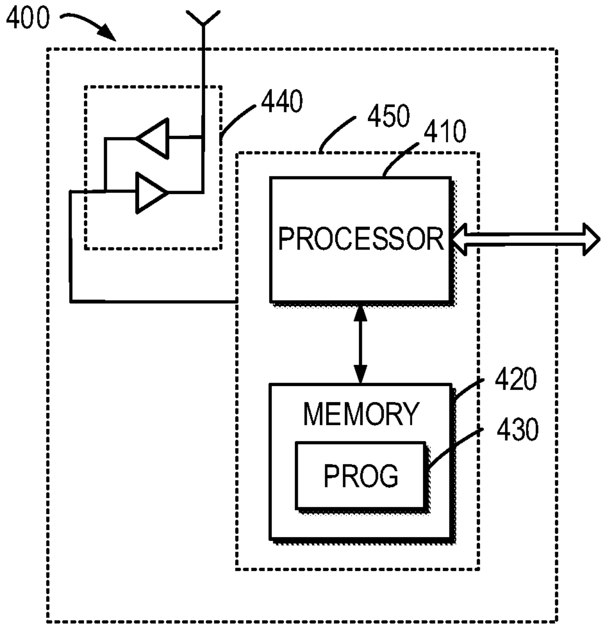
FIG. 4 shows a simplified block diagram of a device that is suitable for implementing example embodiments of the present disclosure.

FIG. 4 is a simplified block diagram of a device 400 that is suitable for implementing embodiments of the present disclosure. The device 400 can be considered as a further example implementation of the terminal device 110 as shown in FIG. 1. Accordingly, the device 400 can be implemented at or as at least a part of the terminal device or the network device.

As shown, the device 400 includes a processor 410, a memory 420 coupled to the processor 410, a suitable transmitter (TX) and receiver (RX) 440 coupled to the processor 410, and a communication interface coupled to the TX/RX 440. The memory 420 stores at least a part of a program 440. The TX/RX 440 is for bidirectional communications. The TX/RX 440 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 440 is assumed to include program instructions that, when executed by the associated processor 410, enable the device 400 to operate in accordance with the embodiments of the present disclosure, as discussed herein with reference to FIGS. 2 to 3. The embodiments herein may be implemented by computer software executable by the processor 410 of the device 400, or by hardware, or by a combination of software and hardware. The processor 410 may be configured to implement various embodiments of the present disclosure. Furthermore, a combination of the processor 410 and memory 420 may form processing means 450 adapted to implement various embodiments of the present disclosure.

The memory 420 may be of any type suitable to the local technical network and may be implemented using any suitable data storage technology, such as a non-transitory computer readable storage medium, semiconductor-based memory devices, magnetic memory devices and systems, optical memory devices and systems, fixed memory and removable memory, as non-limiting examples. While only one memory 420 is shown in the device 400, there may be several physically distinct memory modules in the device 400. The processor 410 may be of any type suitable to the local technical network, and may include one or more of general purpose computers, special purpose computers, microprocessors, digital signal processors (DSPs) and processors based on multicore processor architecture, as non-limiting examples. The device 400 may have multiple processors, such as an application specific integrated circuit chip that is slaved in time to a clock which synchronizes the main processor.

In some embodiments, a terminal device comprises circuitry configured to: perform a sensing procedure for a set of candidate resources associated with a sidelink transmission within a first sensing window after a first time slot; generate a sensing report at least based on the sensing procedure; and provide the sensing report from a physical layer to a higher layer at a second time slot determined based on at least one reference slot associated with the set of candidate resource.

In some embodiments, the terminal device comprises circuitry further configured to: in accordance with a determination that the sensing procedure is triggered at the first time slot, determine an end point of the first sensing window and a first offset time period for processing a result of the sensing procedure; and determine the second time slot based on the first time slot, the end point of the first sensing window and the first offset time period.

In some embodiments, the terminal device comprises circuitry further configured to: determine a set of reference time slots located in a time-domain range of the set of candidate resources; determine a predefined reservation time period supported by a resource pool associated with the sidelink transmission; and determine the end point based on a first reference time slot in the set of reference time slots and the predefined reservation time period.

In some embodiments, the terminal device comprises circuitry further configured to: determine a set of reference time slots located in a time-domain range of the set of candidate resources; determine a predefined reservation time period supported by a resource pool associated with the sidelink transmission; determine a first offset time period for processing a result of the sensing procedure and a second offset time period for a resource selection for the sidelink transmission; and determine the end point based on a minimum value from a first difference and a second difference, the first difference being determined based on a first reference time slot in the set of reference time slots and the predefined reservation time period and the second difference being determined based on a second reference time slot, the first offset time period and the second offset time period.

In some embodiments, the terminal device comprises circuitry further configured to: determine a set of reference time slots located in a time-domain range of the set of candidate resources; determine a first offset time period for processing a result of the sensing procedure and a second offset time period for a resource selection for the sidelink transmission; and determine the end point based on a second reference time slot in the set of reference time slots, the first offset time period and the second offset time period.

In some embodiments, the terminal device comprises circuitry further configured to: determine a set of reference time slots located in a time-domain range of the set of candidate resources; determine a second offset time period for a resource selection for the sidelink transmission; and determine the second time slot based on a second reference time slot in the set of reference time slots and the second offset time.

In some embodiments, the first reference time slot is the last time slot in the set of reference time slots.

In some embodiments, the second reference time slot is the first time slot in the set of reference time slots.

In some embodiments, the second reference time slot is the first time slot in the set of reference time slots on which available resources for the sidelink transmission are contained.

In some embodiments, the terminal device comprises circuitry further configured to: obtain a previous sensing result of a previous sensing procedure performed before the first time slot; and generate the sensing report based on the previous sensing result and a sensing result of the sensing procedure.

In some embodiments, the sensing report indicates available resources for the sidelink transmission obtained from the previous sensing result and the sensing result.

In some embodiments, the sensing report indicates unavailable resources for the sidelink transmission to be excluded from available resources for the sidelink transmission obtained from the previous sensing result, the unavailable resources being obtained from the sensing result.

In some embodiments, the terminal device comprises circuitry further configured to: generate the sensing report based on a sensing result of the sensing procedure.

In some embodiments, the sensing report indicates available resources for the sidelink transmission obtained from the sensing result.

In some embodiments, the terminal device comprises circuitry further configured to: obtain a previous sensing result of a previous sensing procedure performed before the first time slot; obtain a further previous sensing result of a further previous sensing procedure performed after the first time slot and before the sensing procedure; and generate the sensing report based on the previous sensing result, the further previous sensing result and a sensing result of the sensing procedure.

In some embodiments, the sensing report indicates available resources for the sidelink transmission obtained from the previous sensing result, the further previous sensing result and the sensing result.

In some embodiments, the sensing report indicates unavailable resources for the sidelink transmission to be excluded from available resources for the sidelink transmission obtained from the previous sensing result and the further previous sensing result, the unavailable resources being obtained from the sensing result.

In some embodiments, the terminal device comprises circuitry further configured to: determine a set of reference time slots located in a time-domain range of the set of candidate resources; determine a predefined reservation time period supported by a resource pool associated with the sidelink transmission; perform the sensing procedure, in accordance with a determination that a reference time point, determined by a first reference time slot in the set of reference time slots and the predefined reservation time period, is located after at least one of the following: an end point of a second sensing window of the previous sensing procedure, or the first time slot.

In some embodiments, the first reference time slot is the last time slot in the set of reference time slots.

In some embodiments, the terminal device comprises circuitry further configured to: in accordance with a determination that a radio resource control parameter indicating that the sensing procedure is enabled, perform the sensing procedure.

In some embodiments, the terminal device comprises circuitry further configured to: in accordance with a determination that a higher layer parameter concerning resource reservation is not configured, performing the sensing procedure.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 2-3. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method comprising:

performing, by a terminal device, in a case where a higher layer parameter "sl-MultiReserveResource" is disabled, a sensing procedure for a set of candidate resources associated with a sidelink transmission within a sensing window, wherein the sensing window starts at 31 slots before y, wherein the sensing window ends at (a first offset+a second offset) slots earlier than y, and wherein the y is a first slot of candidate slots.

2. The method according to claim 1, wherein the sensing window is after a sensing trigger slot n.

3. The method according to claim 1, comprising:

receiving the higher layer parameter "sl-MultiReserveResource", wherein the higher layer parameter is not configured or is absent.

4. A terminal comprising:

a processor configured to perform, in a case where a higher layer parameter "sl-MultiReserveResource" is disabled, a sensing procedure for a set of candidate resources associated with a sidelink transmission within a sensing window, wherein the sensing window starts at 31 slots before y, wherein the sensing window ends at (a first offset+a second offset) slots earlier than y, and wherein the y is a first slot of candidate slots.

5. The terminal device according to claim 4, wherein the sensing window is after a sensing trigger slot n.

6. The terminal device according to claim 4, wherein the processor is configured to receive the higher layer parameter "sl-MultiReserveResource", and wherein the higher layer parameter is not configured or is absent.

* * * * *